（12）United States Patent
Macken et al.

(10) Patent No.: US 10,410,668 B1
(45) Date of Patent: *Sep. 10, 2019

(54) SENSORLESS MONITORING OF LASER POWER INSTABILITY IN A HEAT-ASSISTED MAGNETIC RECORDING HEAD

(71) Applicant: Seagate Technology LLC, Cupertino, CA (US)

(72) Inventors: Declan Macken, Eden Prairie, MN (US); Tyler Lenn Perry, Cottage Grove, MN (US); Karim Tatah, Eden Prairie, MN (US); Andrei Dorobantu, San Diego, CA (US); Todd Michael Lammers, Lafayette, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/249,452

(22) Filed: Jan. 16, 2019

Related U.S. Application Data

(63) Continuation of application No. 16/049,331, filed on Jul. 30, 2018, now Pat. No. 10,192,578, which is a continuation of application No. 15/408,982, filed on Jan. 18, 2017.

(60) Provisional application No. 62/280,391, filed on Jan. 19, 2016.

(51) Int. Cl.
| | |
|---|---|
| *G11B 5/00* | (2006.01) |
| *G11B 7/1263* | (2012.01) |
| *G11B 5/09* | (2006.01) |
| *G11B 20/18* | (2006.01) |
| *G11B 5/012* | (2006.01) |

(52) U.S. Cl.
CPC .............. *G11B 7/1263* (2013.01); *G11B 5/09* (2013.01); *G11B 20/1816* (2013.01); *G11B 5/012* (2013.01); *G11B 2005/0021* (2013.01); *G11B 2020/1823* (2013.01)

(58) Field of Classification Search
None
See application file for complete search history.

(56) References Cited

U.S. PATENT DOCUMENTS

| | | | |
|---|---|---|---|
| 7,710,686 B2 | 5/2010 | Kim et al. | |
| 8,393,074 B1 | 3/2013 | Takayama et al. | |
| 8,570,842 B1 | 10/2013 | Richter et al. | |
| 8,842,506 B1 | 9/2014 | Matsumoto et al. | |
| 8,854,930 B1 | 10/2014 | Clinton et al. | |

(Continued)

OTHER PUBLICATIONS

Heumier et al., "Mode Hopping in Semiconductor Lasers", 2005, 13 pages.

*Primary Examiner* — Brian M Butcher
(74) *Attorney, Agent, or Firm* — Hollingsworth Davis, LLC (57) ABSTRACT

A slider configured for heat-assisted magnetic recording includes a laser diode optically coupled to a waveguide of the slider. A power supply is coupled to the laser diode. A preamplifier is coupled to the power supply. The preamplifier is configured to monitor a forward voltage across the laser diode while operating the laser diode at a constant current during a write operation, detect a change in the forward voltage indicative of laser power instability, and generate a signal in response to detecting the forward voltage change.

20 Claims, 7 Drawing Sheets

(56) References Cited

U.S. PATENT DOCUMENTS

| | | | |
|---|---|---|---|
| 8,908,481 B1 | 12/2014 | Miyamoto | |
| 9,047,926 B2 | 6/2015 | Contreras et al. | |
| 9,281,659 B1 | 3/2016 | Tatah et al. | |
| 9,318,153 B2 | 4/2016 | Trantham et al. | |
| 9,336,831 B2 | 5/2016 | Burnett et al. | |
| 9,418,691 B2 | 8/2016 | Peng et al. | |
| 9,747,928 B1 | 8/2017 | Ruan et al. | |
| 9,984,719 B2 | 5/2018 | Matousek et al. | |
| 10,255,940 B1 * | 4/2019 | Macken | G11B 5/012 |
| 2004/0202216 A1 | 10/2004 | Fairgrieve | |
| 2009/0296257 A1 | 12/2009 | Nakano et al. | |
| 2011/0122737 A1 | 5/2011 | Shimazawa et al. | |
| 2014/0232585 A1 | 8/2014 | Richardson et al. | |
| 2015/0109892 A1 | 4/2015 | Contreras et al. | |
| 2015/0235665 A1 | 8/2015 | Chu et al. | |
| 2015/0247722 A1 | 9/2015 | Takayama et al. | |
| 2015/0279430 A1 | 10/2015 | Trantham et al. | |
| 2015/0340053 A1 | 11/2015 | Peng et al. | |
| 2016/0087402 A1 | 3/2016 | Tatah et al. | |
| 2016/0104514 A1 | 4/2016 | Burnett et al. | |
| 2016/0189741 A1 | 6/2016 | Tatah et al. | |
| 2016/0232928 A1 | 8/2016 | Honda et al. | |
| 2018/0233171 A1 | 8/2018 | Tatah et al. | |

* cited by examiner

SENSORLESS MONITORING OF LASER POWER INSTABILITY IN A HEAT-ASSISTED MAGNETIC RECORDING HEAD

RELATED PATENT DOCUMENTS

This application is as continuation of U.S. patent application Ser. No. 16/049,331, filed Jul. 30, 2018, which is a continuation of U.S. patent application Ser. No. 15/408,982, filed Jan. 18, 2017, which claims the benefit of Provisional Patent Application Ser. No. 62/280,391, filed on Jan. 19, 2016, to which priority is claimed, and which are incorporated herein by reference in their entireties.

SUMMARY

Various embodiments are directed to a method comprising operating a laser diode of a heat-assisted magnetic recording apparatus at a constant current during a write operation. The method involves monitoring a forward voltage across the laser diode while operating the laser diode at the constant current during the write operation, and detecting a change in the forward voltage indicative of laser power instability. The method also involves taking a corrective action in response to detecting the forward voltage change.

Other embodiments are directed to an apparatus comprising a slider configured for heat-assisted magnetic recording. A laser diode is optically coupled to a waveguide of the slider. A power supply is coupled to the laser diode. A preamplifier is coupled to the power supply and the laser diode. The preamplifier is configured to monitor a forward voltage across the laser diode while operating the laser diode at a constant current during a write operation, detect a change in the forward voltage indicative of laser power instability, and generate a signal in response to detecting the forward voltage change.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures, wherein the same reference number may be used to identify the similar/same component in multiple figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to methods and apparatuses for detecting laser power instability, mode hopping, wavelength change, heat change, or performance change in a laser diode or other optical energy source in a heat-assisted magnetic recording device. Embodiments of this disclosure are directed to methodologies for detecting laser power instability due to optical feedback impacting a laser diode used in heat-assisted magnetic recording (HAMR) devices. In particular, embodiments are directed to "sensorless" techniques for detecting laser power instability of a laser diode used in a HAMR device. The disclosed techniques are considered "sensorless," because they do not involve a discrete sensor, such as a photodiode, bolometer or thermal sensor, which is added to the HAMR device to sense output optical power of the laser diode. Embodiments are directed to apparatuses and methods that use a forward voltage signal of the laser diode to detect laser power instabilities, such as laser mode hops, in a HAMR device.

In HAMR devices, also sometimes referred to as thermal-assisted magnetic recording (TAMR) devices or energy assisted magnetic recording (EAMR), a magnetic recording medium (e.g., hard drive disk) is able to overcome super-paramagnetic effects that limit the areal data density of typical magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, a HAMR recording head (e.g., slider) includes optical components that direct light from a laser to the recording media. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near field transducer (NFT), such as a plasmonic optical antenna. The NFT is designed to support local surface-plasmon at a designed light wavelength. At resonance, high electric field surrounds the NFT due to the collective oscillation of electrons in the metal. Part of the field will get absorbed by a storage medium, raising the temperature of the medium locally for recording. During recording, a write element (e.g., write pole) applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

Figure 1:
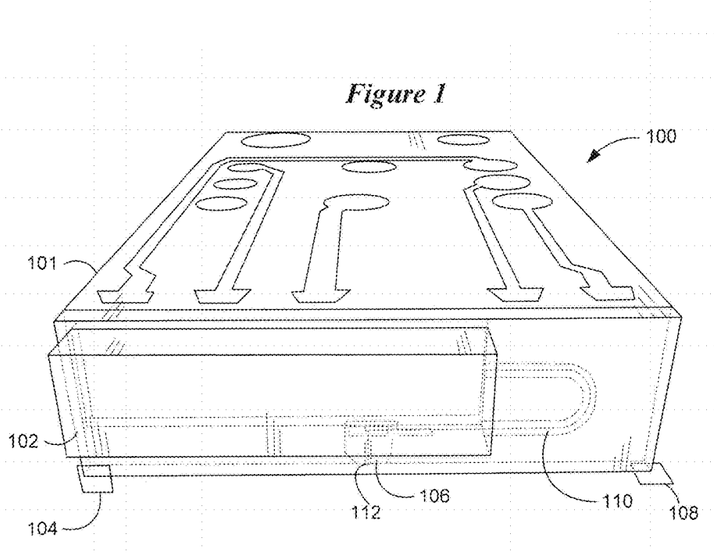
FIG. 1 is a perspective view of a HAMR slider according to various embodiments.
Figure 2:
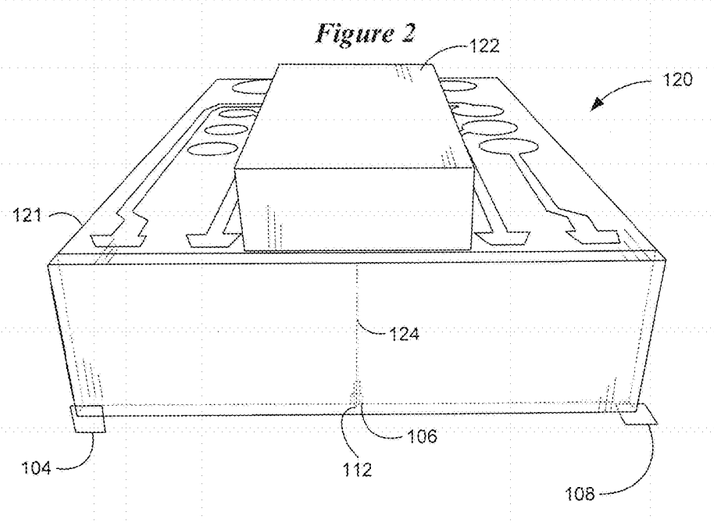
FIG. 2 is a perspective view of a HAMR slider according to some embodiments.

A HAMR drive uses a laser diode to heat the media to aid in the recording process. Due to inefficiencies of electric to optical power, the laser diode also heats itself during lasing. Components (writer, reader, heat elements) in the magnetic slider also dissipate heat and the heat is conducted to laser diode as the laser diode submount is mounted on the slider. To illustrate possible optical transmission paths, FIGS. 1 and 2 show perspective views of HAMR configurations according to example embodiments. In FIG. 1, slider 100 has a laser-in-slider (LIS) configuration. In this configuration, slider 100 includes a slider body 101 having an edge-emitting laser diode 102 integrated into a trailing edge surface 104 of the slider body 101. In this example, the laser diode 102 is disposed within a cavity formed in the trailing edge surface 104. The laser diode 102 is proximate to a HAMR read/write element 106, which has one edge on an air bearing surface 108 of the slider 100. The air bearing surface 108 faces and is held proximate to a moving media surface (not shown) during device operation.

While here the read/write element 106 is shown as a single unit, this type of device may have a physically and electrically separate read element (e.g., magnetoresistive stack) and write element (e.g., a write coil and pole) that are located in the same general region of the slider 100. The separate read and write portion of the read/write element 106 may be separately controlled (e.g., having different signal lines, different head-to-media spacing control elements, etc.), although may share some common elements (e.g., common signal return path). It is noted that in some HAMR devices, a single slider 100 can include two or more read elements and/or two or more write elements.

The laser diode 102 provides electromagnetic energy to heat the media surface at a point near to the read/write element 106. Optical path components, such as a waveguide 110, are formed integrally within the slider 100 to deliver light from the laser diode 102 to the media. In particular, a local waveguide and NFT 112 may be located proximate the read/write element 106 to provide local heating of the media during write operations.

Various components (e.g., 106, 112, including the laser diode 102) may also experience significant heating due to light absorption and electric-to-optical conversion inefficiencies as energy produced by the laser diode 102 is delivered to the magnetic recording medium (not shown). During write operation, these light absorption and inefficiencies will vary the junction temperature of the laser diode, causing a shift in laser emission wavelength, leading to a change of optical feedback from optical path in slider to the cavity of the laser diode 102, a phenomenon that is known to lead to mode hopping/power instability of the laser diode 102. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy with a second wavelength) performing "mode hopping."

It is thought that mode hopping is caused by a temperature induced change in external optical feedback, mainly due to the shift in gain peak wavelength from a change in band gap with temperature. Temperature induced changes in the index of refraction and the thermal expansion of the materials that form the laser cavity can also contribute to mode hopping. Both of these cause the mode wavelength to increase but the contribution from the latter, typically 0.06 nm/K, is much smaller than the peak gain shift, typically 0.25 nm/K. As the temperature at the laser diode junction increases, the gain peak will overtake the modes leading to mode hopping.

Mode hopping is problematic for HAMR applications, as mode hopping leads to laser output power jumping and magnetic transition shifting from one block of data to another. For example, the channel phase lock loop (PLL) is disrupted by the large transition shifts caused by a laser instability event. Large transition shifts in a block of data cannot be recovered in channel decoding, resulting in error bits.

In FIG. 2, a laser-on-slider (LOS) configuration 120 is illustrated. This example includes a laser diode 122 that is mounted on a top surface of a slider body 121. The laser diode 122 is coupled to an optical path of the slider body 121 that includes, among other things, an optical path 124 (e.g., a straight waveguide). In this configuration, the laser diode 122 may also be edge-emitting, such that the light is emitted from the laser diode 122. In order to direct the light towards the air bearing surface 108, the laser diode 122 (or other component) may include optical path elements such as a mirror (not shown) that redirects the light emitted from the laser diode 122 towards the air bearing surface 108. In other configurations, an edge-emitting, top-mounted laser diode may be oriented so that the light emitted directly downwards toward the air bearing surface 108. This may involve placing the laser diode 122 on a submount (not shown) on the top of the slider body 121, the submount orienting the laser output in the desired direction.

While other components shown in FIG. 2, such as the NFT 112 and read/write element 106, are referenced using the same numbers as FIG. 1, the physical configuration of these and other components may differ in the different slider arrangements, e.g., due to the differences in optical coupling pathways, materials, laser power, etc. However, similar to the configuration shown in FIG. 1, the laser diode 122 may experience mode hopping due to writing-induced temperature changes and due to return light (i.e. reflections back into light source) from the light path as well as from the magnetic recording medium.

While not illustrated explicitly in FIGS. 1 and 2, slider configurations may utilize different types of semiconductor laser diodes, such as lasers having a Fabry-Perot laser diode cavity, a distributed Bragg reflector (DBR) laser, and a distributed feedback (DFB) laser. The embodiments described below may be applicable to a variety of energy delivery configurations and laser diode types.

Figure 3:
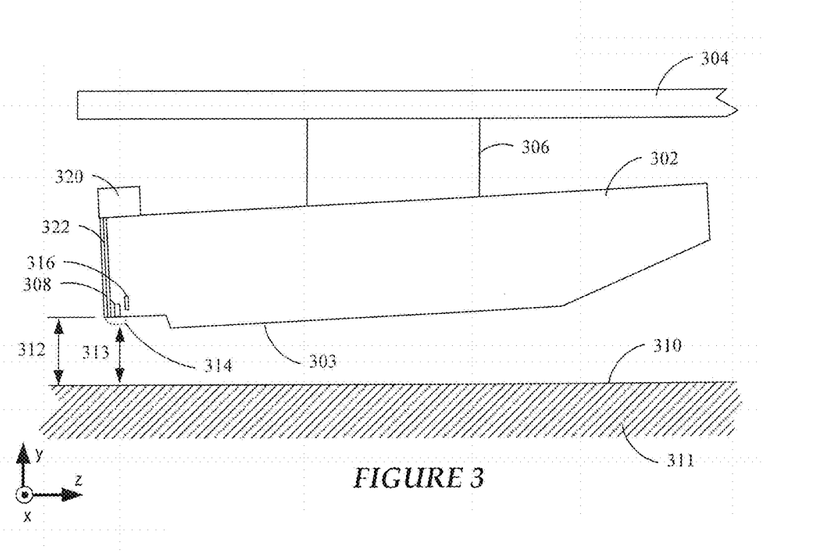
FIG. 3 is a side view of a HAMR slider according to various embodiments.

Referring now to FIG. 3, a block diagram shows a side view of a slider 302 according to a representative embodiment. The slider 302 may be used in a magnetic data storage device, e.g., hard drive, configured for heat-assisted magnetic recording. The slider 302 may also be referred to herein as a read/write head, recording head, etc. The slider 302 is coupled to an arm 304 by way of a suspension 306 that allows some relative motion between the slider 302 and arm 304. The slider 302 includes sliders 308 at a trailing edge that are held proximate to a surface 310 of a magnetic recording medium 311, e.g., magnetic disk. The slider 302 is configured as a HAMR recording head, which includes a laser 320 and a waveguide 322. The waveguide 322 delivers light from the laser 320 to components near the sliders 308.

When the slider 302 is located over surface 310 of recording medium 311, a flying height 312 is maintained between the slider 302 and the surface 310 by a downward force of arm 304. This downward force is counterbalanced by an air cushion that exists between the surface 310 and an air bearing surface 303 (also referred to herein as a "media-facing surface") of the slider 302 when the recording medium 311 is rotating. It is desirable to maintain a predetermined slider flying height 312 over a range of disk rotational speeds during both reading and writing operations to ensure consistent performance. Region 314 is a "close point" of the slider 302, which is generally understood to be the closest spacing between the sliders 308 and the magnetic recording medium 311, and generally defines the head-to-medium spacing 313. To account for both static and dynamic variations that may affect slider flying height 312, the slider 302 may be configured such that a region 314 of the slider 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316.

Figure 4:
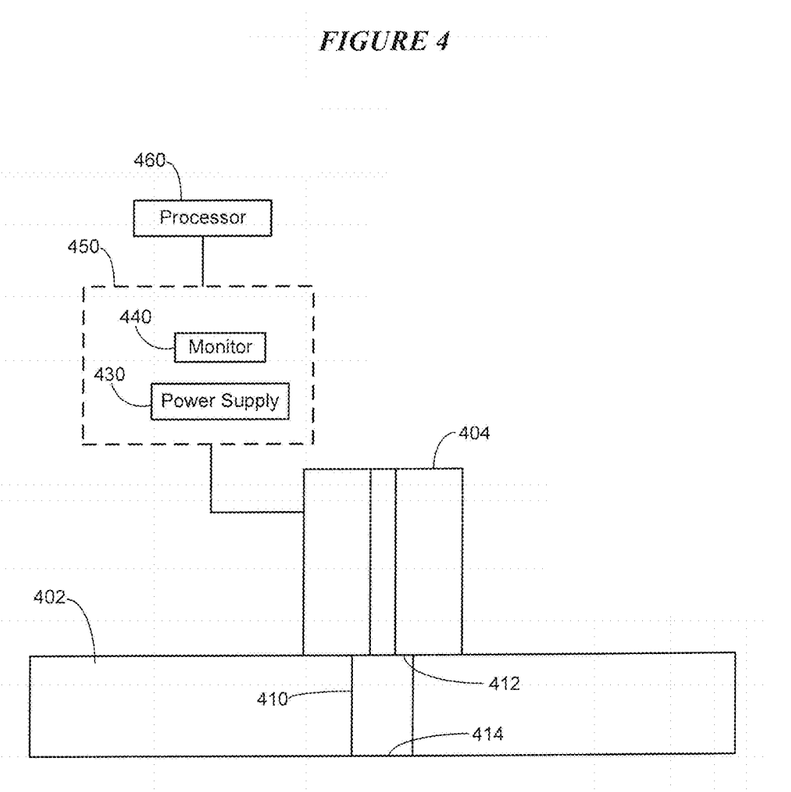
FIG. 4 is a block diagram of a portion of a slider configured for HAMR in accordance with various embodiments.

FIG. 4 is a block diagram of a portion of a slider 402 configured for HAMR in accordance with various embodiments. The slider 402 is shown to include a laser diode 404 which is butt-coupled to an optical waveguide 410 integral to the slider 402. Optical reflections from the either end surface 412 or 414 of the waveguide 410 or from within the waveguide 410 can result in wavelength-dependent optical feedback to the laser diode 404. As the laser diode temperature changes due to laser self-heating or ambient temperature changes, the optical gain versus wavelength dependence will change. Consequently, the laser diode can abruptly switch to a new longitudinal mode that may result in more or less power output from the laser diode than the prior state. The result is an abrupt 'step change' in output optical power of the laser diode 404 which can have detrimental performance consequences.

For example, these abrupt power changes or laser diode power instabilities can disrupt the magnetic recording and reading process causing a degradation or failure in performance. However, some mitigation can be implemented if the recording system is 'aware' that a laser diode power instability occurred during the writing process. Embodiments of the present disclosure are directed to detecting these laser diode power instabilities by detecting changes in the forward voltage of the laser diode when the laser diode is operated in a constant current mode.

Figure 5:
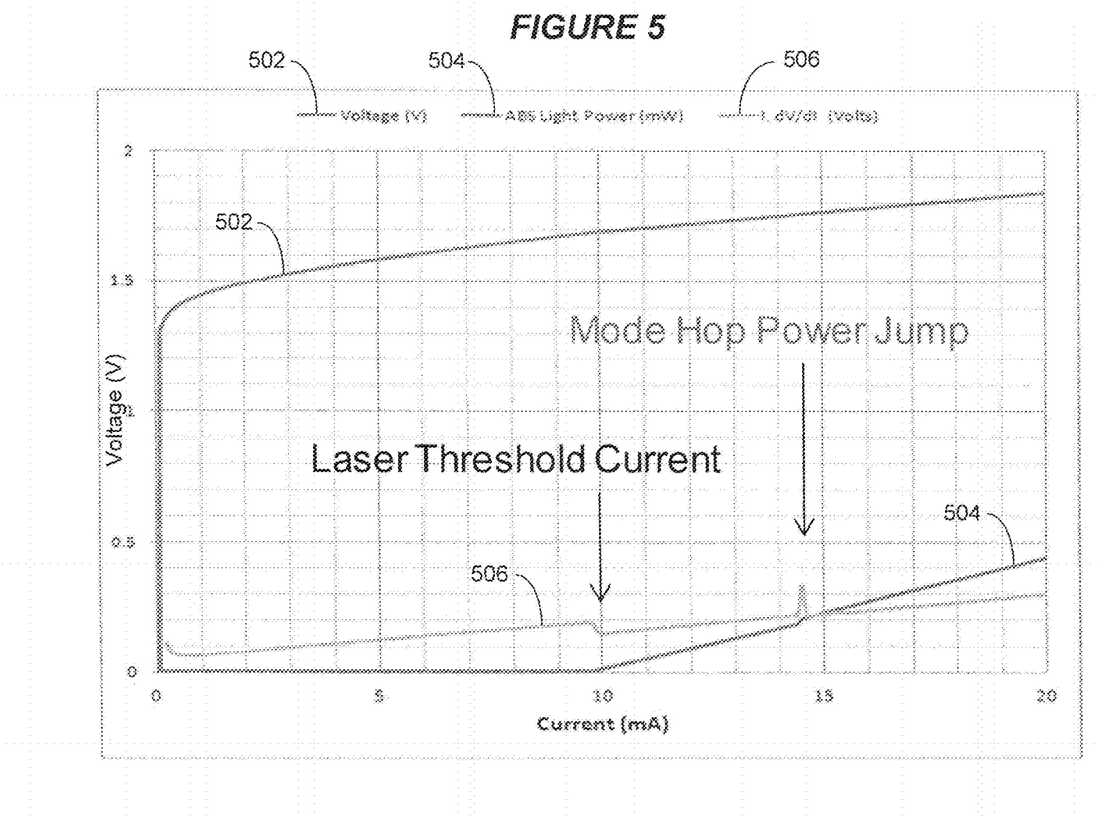
FIG. 5 is a graph that illustrates a laser mode hop for a representative integrated laser in a HAMR head according to some embodiments.

FIG. 5 is a graph that illustrates a laser mode hop for an integrated laser in a representative HAMR head. The graph shows a voltage curve 502 (in Volts), a light power curve 504 (in mW), and a voltage differential curve 506 (IdV/dI in Volts). As can be seen in FIG. 5, the light power curve 504 begins to increase from 0 mW when the laser diode begins conducting (at around 10 mA). The light power curve 504 increases linearly until the laser diode current reaches about 14.5 mA. At about 14.5 mA, an abrupt change (e.g., step change) in the voltage differential curve 506 can be seen. A corresponding change (but smaller in amplitude) in the light power curve 504 can be seen to occur at about 14.5 mA. This step change or discontinuity in the voltage differential curve 506 and the light power curve 504 is indicative of a mode hop. FIG. 5 demonstrates that the voltage of the laser diode can be used as a proxy for light power (output optical power) when monitoring for laser diode power instabilities such as laser mode hops.

It can be shown that the change in laser diode forward voltage correlates well to a wavelength change in the laser cavity. All wavelength changes are also associated with mode hops, however the severity of the output power change is not always correlated to the voltage change delta. However, there is good reason to detect wavelength changes as a possible indicator for increased probability of a severe mode hop. Notably, sensing the laser diode voltage alone as a proxy for output optical power allows for a less complex system, one that does not need any additional output optical power sensor such as a bolometer, photodiode, or thermal sensor.

As is further shown in FIG. 4, a power supply 430 is coupled to the laser diode 404. The power supply 430 is configured to supply power to the laser diode 404, such as by driving the laser diode 404 at a constant current during write operations. A monitor 440 (e.g., voltage monitor) is coupled to the laser diode 404, such as via the power supply 430. The power supply 430 and the monitor 440 can be components/functions that are incorporated in a preamplifier 450 of the HAMR device (see, e.g., FIG. 8). A processor 460 is shown coupled to the preamplifier 450, and is configured to perform remedial operations in response to receiving a fault signal from the monitor 440 indicative of a laser diode power instability (e.g., a laser mode hop).

According to various embodiments, the monitor 440 is configured to monitor the forward voltage across the laser diode 404 to detect laser diode power instabilities. For example, the monitor 440 is configured to monitor the forward voltage across the laser diode 404 when operated under constant current to detect laser diode power instabilities resulting from slider waveguide optical feedback and laser temperature changes from self-heating and/or ambient temperature changes. Data relating to the disclosure have shown the forward voltage across the laser diode 404 to be sensitive to optical feedback induced power changes of the laser diode 404.

According to some embodiments, the monitor 440 is configured to detect a 'step change' in the forward voltage signal of the laser diode 404. This step change can be detected as a percentage change in the magnitude of the forward voltage signal. For example, the monitor 440 can be configured to detect a laser mode hop as a percentage change in the magnitude of the forward voltage signal of between about 0.3% to 3%. This step change can also be detected by the monitor 440 as a threshold change in the slope of the forward voltage signal.

In response to detecting a step change in the forward voltage signal of the laser diode 404, the monitor 440 and/or the processor 460 can be configured to take a corrective action, such as by generating a signal indicating that laser diode power instability has been detected. For example, the monitor 440 can be configured to generate a signal indicating that laser diode power instability has been detected. The monitor 440 can set a flag for the preamplifier 450 or read/write channel indicating that corrective action should be taken. The corrective action can be coordinated by the processor 460.

According to some embodiments, data that was written during the detected laser diode power instability can be re-written to the storage medium under the control of the processor 460. For example, data that was written during the detected laser diode power instability may be stored in a buffer. If available, this data can be transferred from the buffer to the storage medium by the processor 460 as part of a re-writing procedure.

According to other embodiments, and as part of a drive commissioning process, the forward voltage signal of the laser diode 404 can be used to 'map out' laser instability locations versus current and temperature to keep track of useable operating space. During manufacture, for example, a HAMR head can be tested at different operating temperatures and laser diode current levels in an attempt to evaluate the head for potential laser mode hopping across a range of operating temperatures and currents. For example, a self-test can be implemented by the processor 460 for each slider of a HAMR device to characterize temperature boundaries for a multiplicity of laser diode current levels where a mode hop occurs during a write operation. A map of these temperature boundaries for each current level can be stored in the HAMR device. This map can be used during normal drive operation to avoid laser diode operating states that have previously resulted in power instabilities (e.g., mode hops).

During operation, the HAMR device may implement a procedure to change the junction temperature of the laser diode 404 to avoid the temperature boundaries where mode hops have been previously detected (e.g., previously mapped). For example, the laser bias current can be adjusted in an attempt to reduce or eliminate the occurrence of laser mode hopping of a HAMR head. Changing the laser bias current serves to change the junction temperature of the laser diode. A heater can be incorporated adjacent the laser diode 404 of a HAMR head which can be controlled to adjustably heat the laser diode. The writer heater and/or reader heater can be adjusted during writing to change the junction temperature of the laser diode. For example, the writer heater and/or reader heater can be adjusted during a preheat phase in order to change the junction temperature of the laser diode. A laser overshoot can be added to change the junction temperature of the laser diode.

In further embodiments, and during normal drive operation, the apparatus can be configured to periodically perform a test write and monitor the forward voltage of the laser diode 404 to look for forward voltage step changes. In response to detecting forward voltage step changes, the power supply 430 can modify the laser diode bias current to avoid voltage step changes during normal write operations.

According to some embodiments, the monitor 440 can be configured to count the number of occurrences of detected forward voltage changes and compare this count to a predetermined integer (e.g., threshold). An increase in the count of detected forward voltage changes can indicate that a temperature boundary where mode hops occur is being approached. The processor 460 can be configured to take a corrective action in response to the number of occurrences exceeding the predetermined integer. For example, the processor 460 can change the current supplied to the laser diode 404 or attempt to change the temperature of the laser diode junction in a manner described hereinabove. The predetermined integer can be determined empirically or through modeling. For some embodiments, the predetermined integer can range between about 1 and 1,000.

In some cases, a detected laser mode hop can be non-severe, in which case the channel can correct for the output power amplitude change or some form of compensation can be implemented as a corrective action. In other cases, a detected laser mode hop can be severe and, if repeatable, can render the head non-functional. According to some embodiments, the processor 460 can be configured to determine (e.g., grade) the severity of mod hop events. One representative approach can involve recording a metric of write performance for each of the writes made by a HAMR head. In some embodiments, the write performance metric is bit error rate (BER). In other embodiments, the write performance metric can be a sector write width or a sector amplitude. The processor 460 can be configured to calculate fluctuations in the write performance metric, and detect whether the head has a laser mode hop problem using the metric fluctuations.

The processor 460 can be configured to categorize a severity of the laser mode hop problem. For example, the processor 460 may categorize a laser mode hop as severe if the write performance metric exceeds a predetermined threshold (e.g., the BER is lower than a predetermined BER). In response to detecting a severe laser mode hop, the processor 460 can be configured to take corrective action, such as reporting the existence of laser mode hop, triggering a solution for laser mod hop (e.g., one previously described), triggering a read-after-write procedure, triggering a revolution-based write procedure, or reporting head degradation to a host, among other actions.

Figure 6:
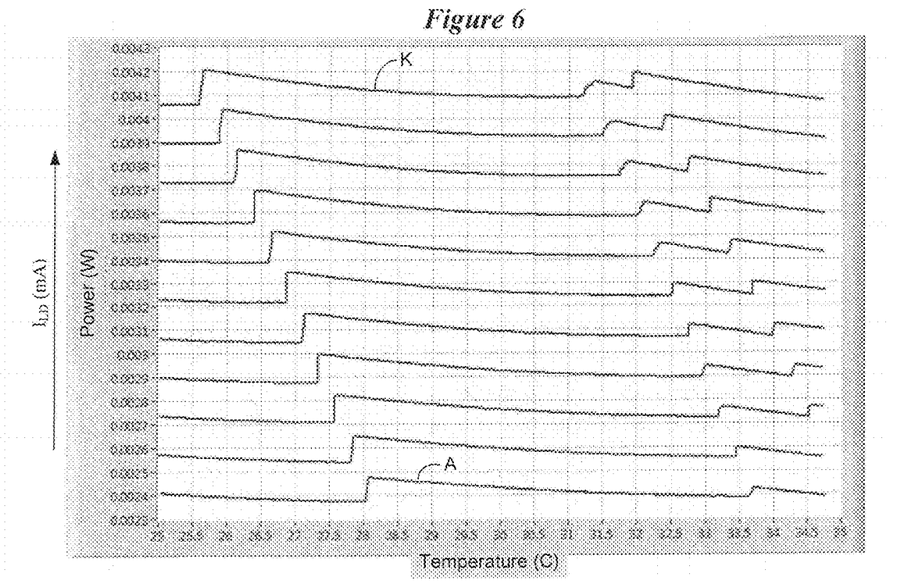
FIG. 6 is a graph showing output optical power of a laser diode as a function of diode temperature for each of a multiplicity of laser diode current levels according to various embodiments.
Figure 7:
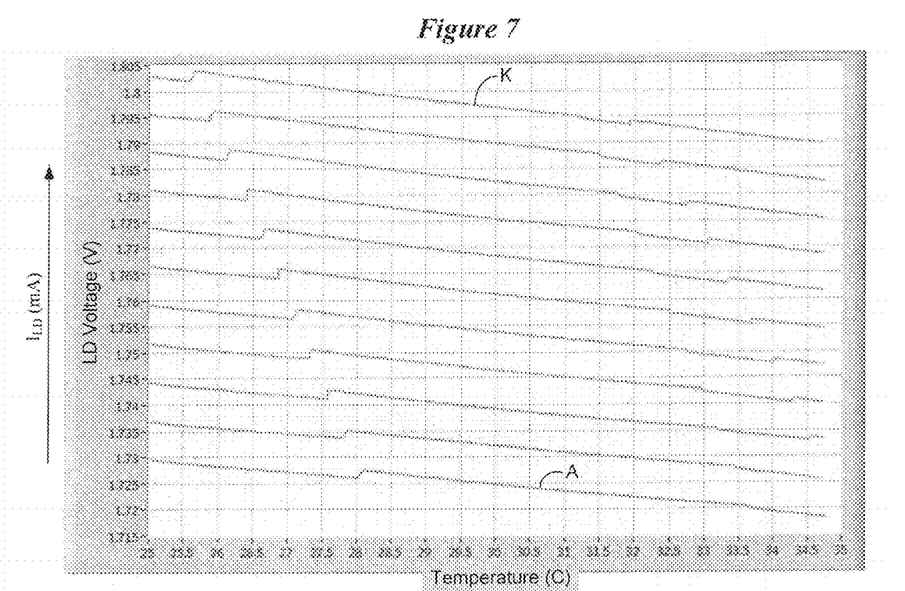
FIG. 7 is a graph showing laser diode voltage as a function of diode temperature for each of a multiplicity of laser diode current levels according to various embodiments.

FIGS. 6 and 7 show data acquired from a test slider during experimentation. The test slider is a combination of a HAMR recording head and a laser diode, which together constitute a sub-assembly of a complete head gimbal assembly (HGA). FIG. 6 is a plot of output optical power of the laser diode (y-axis) and temperature (x-axis) of the laser diode for each of a number of different laser diode current levels (curves A-K). More particularly, the power indicated along the y-axis represents far field total power from the test slider's optical waveguide as measured by an integrating sphere. The temperature indicated along the x-axis represents the temperature of a heat sink coupled to the laser diode.

Each of FIGS. 6 and 7 includes 11 curves (A-K). Each of the 11 curves represents a different laser diode current, with the level of current increasing along the y-axis. For example, curve A of FIG. 6 represents that same laser diode current as curve A of FIG. 7. Similarly, curve K of FIG. 6 represents that same laser diode current as curve K of FIG. 7. The data of FIGS. 6 and 7 show that there is a time correlation between the optical power jumps (see FIG. 6) and the discontinuities in the forward voltage signal of the laser diode (see FIG. 7). For example, the step change in power for curve K in FIG. 6 occurs at the same time as the step change in voltage for curve K in FIG. 7. The time correlation between the power and voltage curves shown in FIGS. 6 and 7 demonstrates that the laser diode voltage can serve as a proxy for output optical power for purposes of monitoring for and detecting laser power instabilities such as mode hops.

The curves in FIGS. 6 and 7 also show a temperature range within which the power and voltage are stable (continuous) for each of the current levels. For example, the power and voltage curves K of FIGS. 6 and 7 are stable between laser diode temperatures of about 25.8° C. and 31.1° C. The power and voltage curves A of FIGS. 6 and 7 are stable between laser diode temperatures of about 28.2° C. and 33.6° C. The ends of these temperature ranges represent temperature boundaries where mode hops occur. As was previously discussed, the voltage data shown in FIG. 7 can be used to generate a map of locations of laser instability. Such a map can be used by a HAMR device during operation to avoid current and temperature combinations that are likely to produce mode hops.

Figure 8:
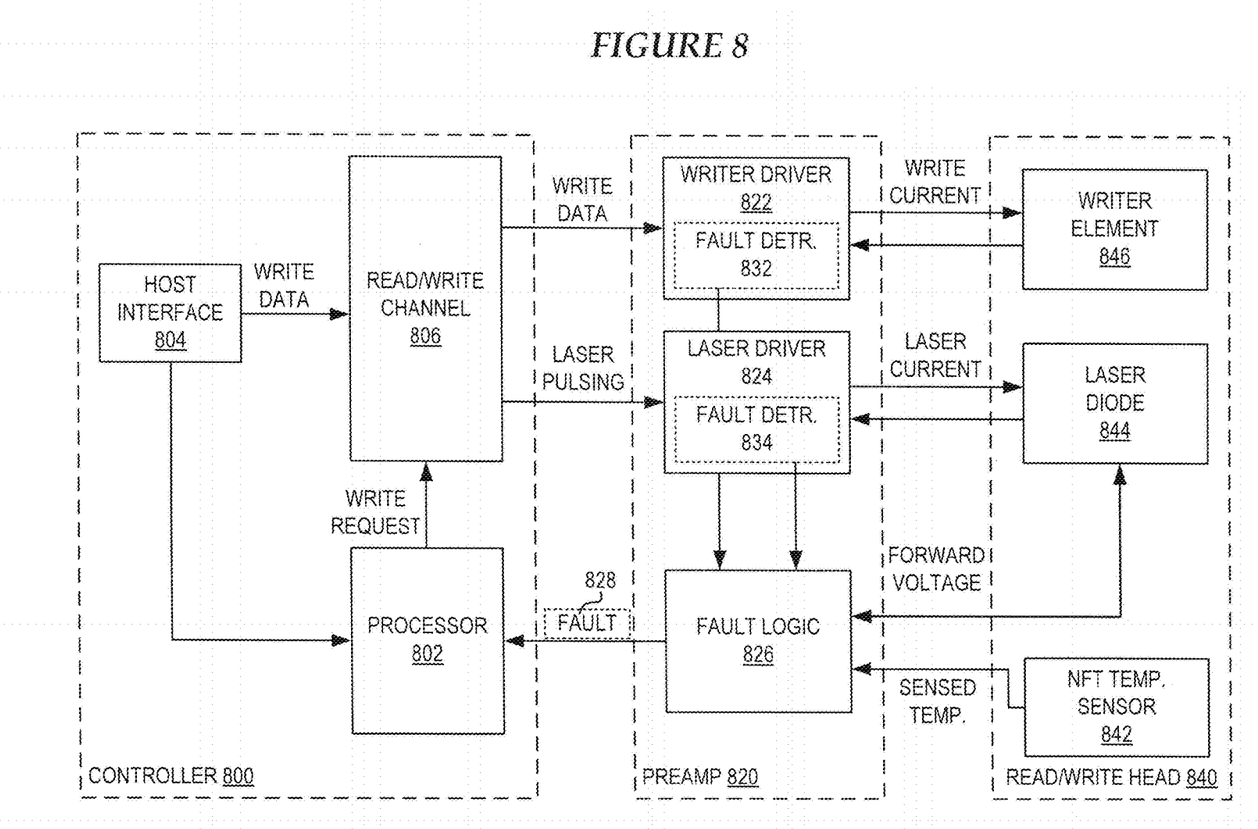
FIG. 8 shows details of a fault detection system that can be implemented in a hard disk drive configured for HAMR in accordance with various embodiments.

FIG. 8 shows details of a fault detection system that can be implemented in a hard disk drive (HDD) configured for HAMR in accordance with various embodiments. To prevent undetected write errors, the HDD may implement multiple feedback loops for the detection of various types of failures, particularly for detecting failures related to HAMR. The fault detection system shown in FIG. 8 resides primarily in a preamplifier 820, which is shown coupled to a read/write head 840 and a controller 800. The read/write head 840 includes a writer element 846, a laser diode 844, and a near-field transducer (NFT) temperature sensor 842. The writer element 846 is coupled to a writer driver 822 of the preamplifier 820. The laser diode 844 is coupled to a laser driver 824 and to fault logic 826 of the preamplifier 820. The NFT temperature sensor 842 is also shown coupled to the fault logic 826.

The controller 800 includes a read/write channel 806 which is coupled to the writer driver 822 and the laser driver 824 of the preamplifier 820. The controller 800 also includes a processor 802 coupled to the read/write channel 806 and the fault logic 826 of the preamplifier 820. A host interface 804 of the controller 800 is coupled to the read/write channel 806 and the processor 802.

The writer driver 822 of the preamplifier 820 receives a write signal from the read/write channel 806, conditions the signal, and drives the writing current to the writer element 846 on the target read/write head 840 for writing data to a magnetic recording medium. The laser driver 824 of the preamplifier 820 receives a laser pulsing signal from the read/write channel 806 and drives the current to the laser diode or other optical energy source 844 of the HAMR-enable read/write head 840.

According to various embodiments, the preamplifier 820 contains fault logic 826 to detect failures that may occur during writing operations. The fault logic 826 may receive feedback signals from fault detectors 832, 834 in the writer driver 822 and laser driver 824, the NFT temperature sensor 842, and other sensors or detectors in the read/write head 840 or other components during a write operation and utilize the feedback signals to detect failure that may have resulted in a write error. In particular, the fault logic 826 monitors the forward voltage of the laser diode 844 and detects a step change (discontinuity) in the forward voltage indicative of a laser mode hop.

If a laser mode hop is detected during a write operation, the fault logic 826 asserts a fault signal 828 back to the controller 800 indicating the potential for write error exists. In some embodiments, the processor 802 may be configured to determine the severity of the mode hop in a manner previously described. In response to the fault signal 828, the processor 802 may take a corrective action, such as any of those described hereinabove. The processor 802 may perform error recovery to avoid loss of the data. Error recovery may comprise retrying the write operation with read verification, reporting the failure to the host device, and the like.

Figure 9:
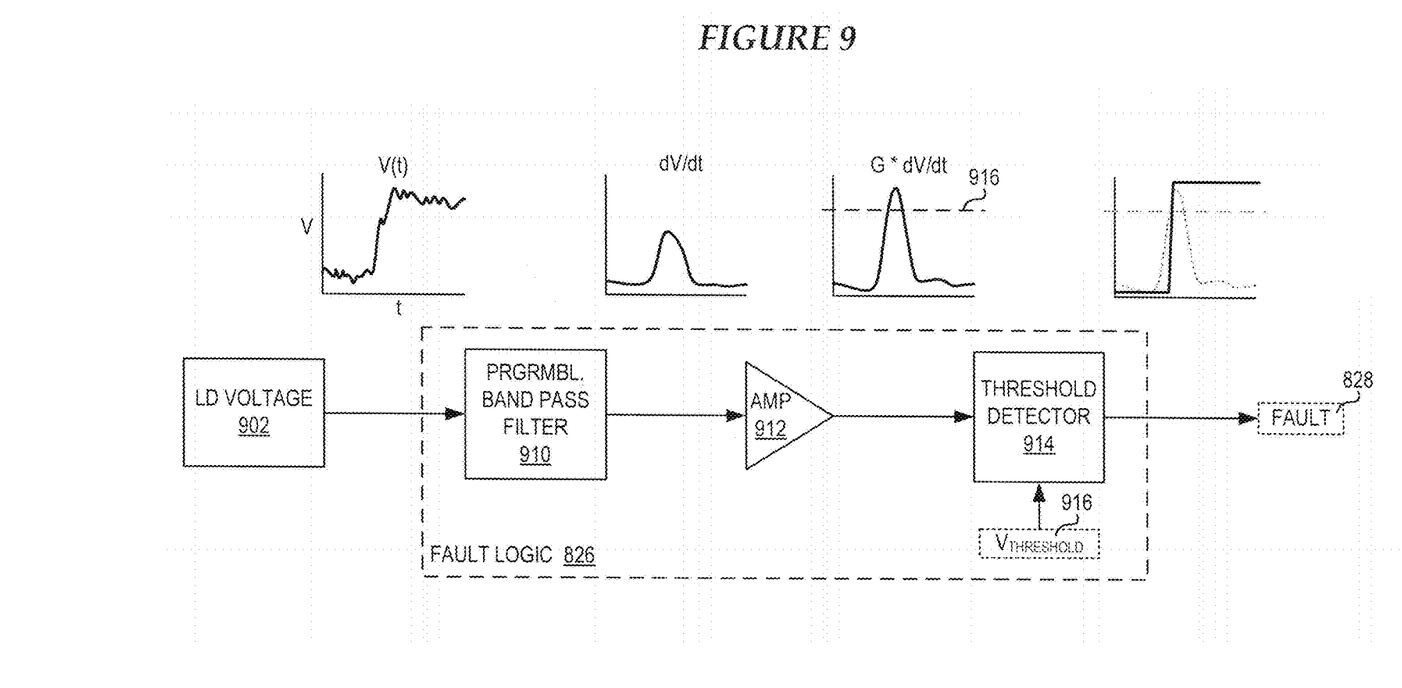
FIG. 9 illustrates one implementation of fault logic comprising components to detect mode hopping in a laser diode according to some embodiments.

FIG. 9 illustrates one implementation of fault logic 826 comprising components to detect mode hopping in the laser diode or other optical energy source 844 according to some embodiments. The fault logic 826 receives a signal from the laser diode 844 representative of the forward voltage 902 of the laser diode 844 over time, referred to as V(t) in the figure. In some embodiments, the fault logic 826 may pass the voltage signal V(t) through a programmable band-pass filter 910. The programmable band-pass filter 910 may be configured to implement a low-pass filter ("LPF") to remove any high-frequency noise present in the voltage signal and a high-pass filter ("HPF") to differentiate the signal, producing a differentiated signal representing the rate of change in the forward voltage of the laser diode 844 at any given time, referred to as dV/dt in FIG. 9.

Because the sudden shift in forward voltage of the laser diode 844 that occurs in a mode hop can be very low (e.g., 1% or less), the fault logic 826 may next send the differentiated signal dV/dt to an amplifier 912 where it is amplified before further analysis. Next, the amplified differentiated signal G*dV/dt is sent to a threshold detector 914. The threshold detector 914 is configured to assert a digital fault signal 828 to the controller 800 when the differentiated signal G*dV/dt exceeds a configurable threshold value. According to some embodiments, the threshold value corresponds to a rate of change in the forward voltage of the laser diode 844 that indicates a likely mode hop. In some embodiments, the threshold value is configurable in the HDD. For example, the threshold value may be determined during a configuration testing or "burn-in" phase of the HDD and stored in the memory of the controller 800. In other embodiments, the threshold value may be preset in the preamplifier 820 for the model or class of storage devices in which the preamplifier is implemented, based on the type and characteristics of the laser diode 844.

According to some embodiments, the threshold detector 914 may comprise a comparator and a digital logic circuit. The threshold value may represent a threshold voltage level 916 that is supplied to the threshold detector by the fault logic 826. The threshold voltage level 916 may be received directly from the controller 800, or the processor 802 set a register value in the preamplifier 820 from which the threshold voltage level is generated by the fault logic 826. The threshold voltage level 916 may be compared to the amplified differentiated signal G*dV/dt by the comparator, and when the threshold level is exceeded, the threshold detector 914 may raise the digital fault signal 828 to the controller 800. As shown in FIG. 9, the fault signal 828 is raised at the point in time corresponding to the crossing point of the amplified differentiated signal G*dV/dt and the threshold voltage level 916. According to further embodiments, the fault signal 828 may remain asserted until reset by the controller 800 or upon initiation of a subsequent write operation, for example.

In one embodiment, the laser diode voltage itself is differentiated within the preamplifier 820 and sent to the fault logic 826 for threshold detection 914. The fault signal 828 is sent to the controller 800 to abort a write. The aborted write would also be followed by a read-verify and possible re-write to address the poor write that was possible due to a mode hop event. Other usage models may attempt to clearly find the window of temperature range that the laser does not mode-hop.

In some embodiments, the laser voltage changes can be conditionally flagged in terms of amplitude severity. For example, the threshold detector 914 can be configured to use a multiplicity of voltage thresholds 916 to effectively categorize the amplitude severity of the laser voltage change. In further embodiments, the output of the threshold detector 914 can be sent to a counter, and the fault logic 826 would issue a fault signal 828 only if a specific number of threshold crossings were observed. The threshold detection could be set above the noise floor and all laser voltage changes with sufficient SNR could be flagged. Thus, a large subset of significant wavelength changes could be flagged or counted.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
operating a laser diode of a heat-assisted magnetic recording apparatus at a constant current during a write operation;
monitoring a forward voltage across the laser diode while operating the laser diode at the constant current during the write operation;
detecting a change in the forward voltage indicative of laser power instability due to mode hopping; and
taking a corrective action in response to detecting the forward voltage change, wherein taking the correction action comprises setting a flag.

2. The method of claim 1, wherein the flag is a flag for a pre-amp or a channel of the apparatus indicating that data needs to be re-written.

3. The method of claim 1, wherein the flag is a flag indicating amplitude severity of the forward voltage change.

4. The method of claim 1, wherein detecting the forward voltage change comprises detecting a step change in the forward voltage.

5. The method of claim 1, wherein detecting the forward voltage change comprises comparing the detected forward voltage change to a predetermined threshold.

6. The method of claim 1, comprising:
counting a number of occurrences of the detected forward voltage change; and
taking the corrective action in response to the number of occurrences exceeding a predetermined integer.

7. The method of claim 1, comprising:
repeating the method at each of a plurality of different constant currents; and
determining temperature boundaries for each of the different constant currents where the forward voltage change is detected.

8. The method of claim 7, comprising:
mapping the temperature boundaries; and
avoiding the mapped temperature boundaries during write operations.

9. The method of claim 1, comprising:
periodically performing a test write operation; and
repeating the method after performing the test write operation.

10. The method of claim 1, comprising characterizing a severity of the laser power instability in response to detecting the forward voltage change.

11. An apparatus, comprising:
a slider configured for heat-assisted magnetic recording;
a laser diode optically coupled to a waveguide of the slider;
a power supply coupled to the laser diode;
a preamplifier coupled to the power supply and the laser diode, the preamplifier configured to:
monitor a forward voltage across the laser diode while operating the laser diode at a constant current during a write operation;
detect a change in the forward voltage indicative of laser power instability due to mode hopping; and
take a corrective action in response to detecting the forward voltage change, wherein taking the correction action comprises setting a flag.

12. The apparatus of claim 11, wherein the flag is a flag indicating that data needs to be re-written.

13. The apparatus of claim 11, wherein the flag is a flag indicating amplitude severity of the forward voltage change.

14. The apparatus of claim 11, wherein the preamplifier is configured to detect a step change in the forward voltage.

15. The apparatus of claim 11, wherein the preamplifier is configured to compare the detected forward voltage change to a predetermined threshold.

16. The apparatus of claim 11, wherein the preamplifier is configured to:
count a number of occurrences of the detected forward voltage change; and
take a corrective action in response to the number of occurrences exceeding a predetermined integer.

17. The apparatus of claim 11, comprising a processor coupled to the preamplifier, wherein:
the preamplifier is configured to monitor the forward voltage, detect the forward voltage change, and generate a signal in response to detecting the forward voltage change at each of a plurality of different constant currents; and
the processor is configured to determine temperature boundaries for each of the different constant currents where the forward voltage change is detected.

18. The apparatus of claim 17, wherein the processor is configured to:
map the temperature boundaries; and
avoid the mapped temperature boundaries during write operations.

19. The apparatus of claim 11, comprising a processor coupled to the preamplifier, wherein the processor is configured to:
periodically perform a test write operation; and
monitor the forward voltage, detect the forward voltage change, and generate a signal in response to detecting the forward voltage change after performing the test write operation.

20. The apparatus of claim 11, comprising a processor coupled to the preamplifier, wherein the processor is configured to characterize a severity of the laser power instability in response to detecting the forward voltage change by the preamplifier.

* * * * *